(12) United States Patent
Tanrikulu et al.

(10) Patent No.: US 7,050,545 B2
(45) Date of Patent: May 23, 2006

(54) METHODS AND APPARATUS FOR ECHO CANCELLATION USING AN ADAPTIVE LATTICE BASED NON-LINEAR PROCESSOR

(75) Inventors: Oguz Tanrikulu, Wellesley, MA (US); John O. DellaMorte, Jr., Sandwich, MA (US)

(73) Assignee: Tallabs Operations, Inc., Naperville, IL (US)

( * ) Notice: Subject to any disclaimer, the term of this patent is extended or adjusted under 35 U.S.C. 154(b) by 346 days.

(21) Appl. No.: 10/121,437

(22) Filed: Apr. 11, 2002

(65) Prior Publication Data

US 2003/0031314 A1 Feb. 13, 2003

Related U.S. Application Data

(60) Provisional application No. 60/283,321, filed on Apr. 12, 2001.

(51) Int. Cl.
*H04M 9/08* (2006.01)
(52) U.S. Cl. .................... 378/406.08; 379/406.01; 379/406.02; 379/406.03; 379/406.05
(58) Field of Classification Search ............ 379/406.08
See application file for complete search history.

(56) References Cited

U.S. PATENT DOCUMENTS

| | | | | |
|---|---|---|---|---|
| 4,349,699 A | * | 9/1982 | Asada et al. | 704/263 |
| 5,274,705 A | * | 12/1993 | Younce et al. | 379/406.01 |
| 5,321,793 A | * | 6/1994 | Iacovo et al. | 381/38 |
| 5,748,751 A | * | 5/1998 | Janse et al. | 379/406.01 |
| 6,163,608 A | * | 12/2000 | Romesburg et al. | 379/406.01 |
| 6,597,787 B1 | * | 7/2003 | Lindgren et al. | 379/406.05 |
| 6,665,402 B1 | * | 12/2003 | Yue et al. | 379/406.01 |

FOREIGN PATENT DOCUMENTS

JP HEI 2-278926 * 11/1990

OTHER PUBLICATIONS

Haykin, Simon: "Adaptive Filter Theory" (BOOK), 1996, Pub: Prentice Hall, pp. 280-286.*
Yoo et al, "A New Double Talk Detector Using the Lattice Predictors for an Acoustic Echo Canceller", 1997, IEEE TENCON, Proc. vol. 2, Dec. 2-4, 1997, pp. 483-486.*
Makhoul et al, "Adaptive Lattice Analysis of Speech", IEEE Trans. on Acoustics, Speech, and Signal Processing, vol. ASSP-29 No. 3, Jun. 1981.*
Prentice Hall, Simon Haykin, "Adaptive Filter Theory", pp. 536-543, Upper Saddle River, New Jersey, published Sep. 14, 2001.

* cited by examiner

*Primary Examiner*—Sinh Tran
*Assistant Examiner*—Ramnandan Singh
(74) *Attorney, Agent, or Firm*—Tellabs Law Dept.; Cheryl M. Fernandez (57) ABSTRACT

A non-linear processor for managing a speech signal is disclosed. The non-linear processor includes an adaptive lattice filter that generates a prediction error from a residual echo of the speech signal, a signum non-linearity unit that generates an excitation component from the prediction error, an excitation signal mixer that generates an excitation signal from the excitation component and a noise component, an inverse lattice filter that generates a modified residual echo from the excitation signal, and a gain adjuster that adjusts a power of the modified residual echo.

18 Claims, 9 Drawing Sheets

METHODS AND APPARATUS FOR ECHO CANCELLATION USING AN ADAPTIVE LATTICE BASED NON-LINEAR PROCESSOR

RELATED APPLICATIONS

This patent application claims priority to the provisional patent application having the assigned Ser. No. 60/283,321 filed on Apr. 12, 2001, entitled "BETTER SIGNAL TRANSPARENCY THROUGH ADAPTIVE LATTICE BASED NON-LINEAR PROCESSOR (AL-NLP) FOR ECHO CANCELLATION".

FIELD OF THE INVENTION

The present invention relates to the field of speech signal management. More specifically, the present invention relates to echo cancellation in speech signal management.

BACKGROUND OF THE INVENTION

Adaptive methods such as adaptive filters are employed in echo-cancellers because adaptive methods can adjust their algorithms according to fluctuations in incoming speech signals. However, adaptive methods employed in echo-cancellers (ECs) may have problems removing echoes of speech signals completely due to the fundamental limitations related with convergence speed and steady-state performance. This is often true for normalized least mean square (NLMS) based methods that are used in the industry. To compensate for these problems, non-linear processors (NLPs) may also be included in an adaptive method to further process a residual echo signal.

Figure 1:
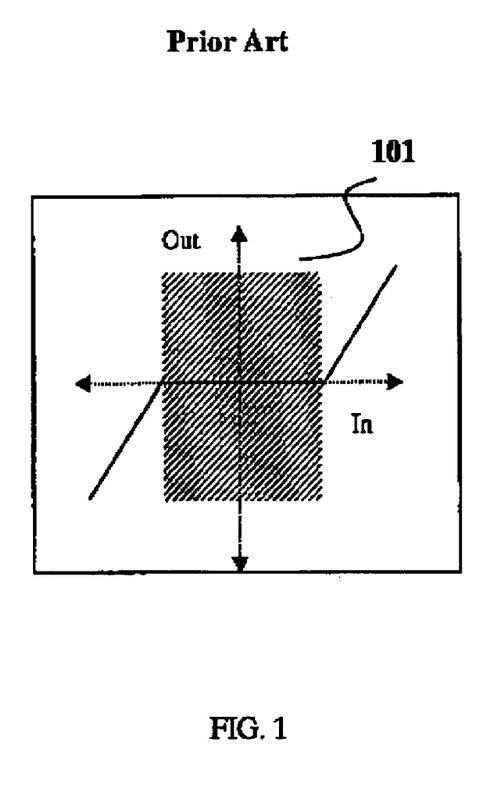
FIG. 1. is a graph illustrating center-clipping non-linearity.

NLPs use a non-linearity such as a center-clipper shown in FIG. 1 to remove a residual echo signal. However, in removing a residual echo signal, too much energy may be suppressed. For example in FIG. 1, a center-clipper may remove the input signal that falls into hatched region 101. To replace some of the suppressed energy, different approaches may be taken. One approach is to use a noise injection scheme to replace the suppressed energy. This may involve simple injection of spectrally shaped or spectrally matched noise.

Figure 2:
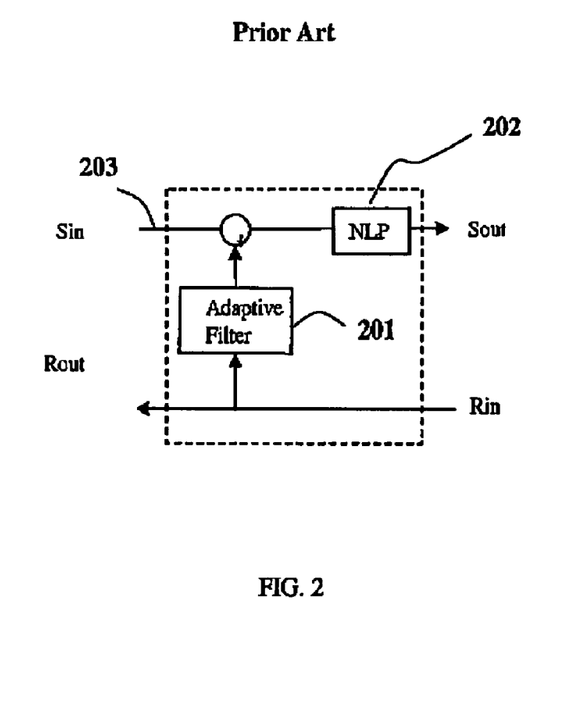
FIG. 2. is a block diagram of an echo canceller (EC) that includes an adaptive filter and a non-linear processor (NLP)

While schemes based on the above ideas may be implemented in practice and are improvements of prior approaches, their performances leave room for improvement with the increased demand for voice quality. FIG. 2 illustrates one of these schemes. FIG. 2 shows an echo canceller (EC) that includes an adaptive filter 201 and a non-linear processor (NLP) 202. Consider the EC operating in a condition where the send-in (Sin) port at line 203 of the EC has a low-level coherent background signal such as music, people chatting, etc. The portions of the signal that have this background signal typically pass through the NLP practically unaltered. However, when there is echo and background signals simultaneously present in the Sin port, the NLP while removing the residual echo may also remove the background signal. Because the noise injection scheme in the NLP may not completely restore the integrity of the background signal to an acceptable level, a non-consistent background may be produced.

Because many linear processing methods do not completely separate the residual echo from the background signal, the objective of further removing the residual echo while preserving the integrity of the background signal creates opportunities to improve these methods. Thus a method and apparatus for more effectively managing speech signals that may include both a residual echo and a background signal is needed.

SUMMARY OF THE INVENTION

A non-linear processor for managing a speech signal is disclosed. The non-linear processor includes an adaptive lattice filter that generates a prediction error from a residual echo of the speech signal, a signum non-linearity unit that generates an excitation component from the prediction error, an excitation signal mixer that generates an excitation signal from the excitation component and a noise component, an inverse lattice filter that generates a modified residual echo from the excitation signal, and a gain adjuster that adjusts a power of the modified residual echo.

A method of processing a residual echo of a speech signal is disclosed. The method includes generating a prediction error from the residual echo, generating an excitation signal from the prediction error and a noise component, and generating a modified residual echo from the excitation signal.

A method of processing a speech single is disclosed. The method includes center-clipping a residual echo from the speech signal in response to detecting an absence of double-talk on the speech signal, injecting onto the speech signal white noise that matches a spectral envelope of a background signal of the speech signal, and adjusting a power of the speech signal.

DESCRIPTION OF THE DRAWINGS

The present invention is illustrated by way of example and not by way of limitation in the figures of the accompanying drawings, in which like references indicate similar elements and in which.

DETAILED DESCRIPTION

Figure 3:
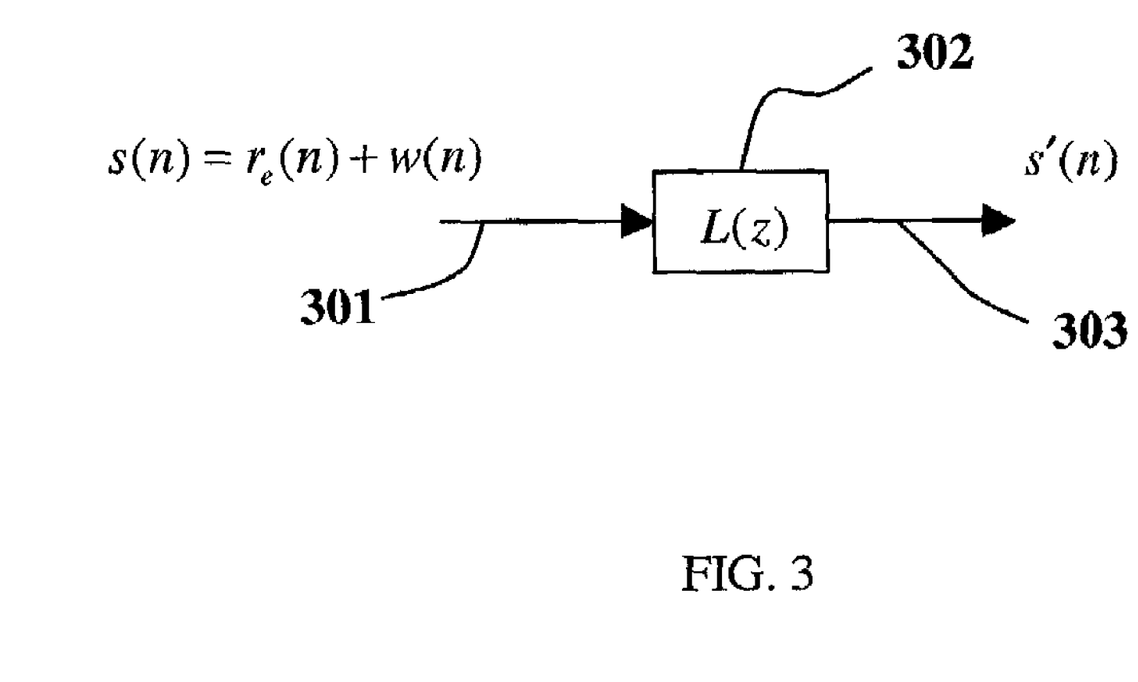
FIG. 3. is a block diagram illustrating whitening of a speech signal s(n), according to an exemplary embodiment of the present invention.

FIG. 3 illustrates a concept of an exemplary embodiment of the present invention. It is a block diagram showing whitening of a speech signal s(n). In FIG. 3, input speech signal s(n) at line 301 is filtered by filter L(z) 302 and s'(n) at line 303 is a prediction error signal which is essentially whiter than the input. The input speech signal s(n) can be described in the following equation:

$$s(n) = r_e(n) + w(n)$$

where $r_e(n)$ is residual echo after cancellation and w(n) is the correlated near-end background noise signal and s(n) is the sum of the two. The optimal filter L(z) is computed during portions of background noise and the prediction error signal s'(n) is not completely white in general, and how much the prediction error signal is whitened depends on the order of L(z) used. An optimal filter L(z) essentially models the spectral envelope of its input signal.

Figure 4:
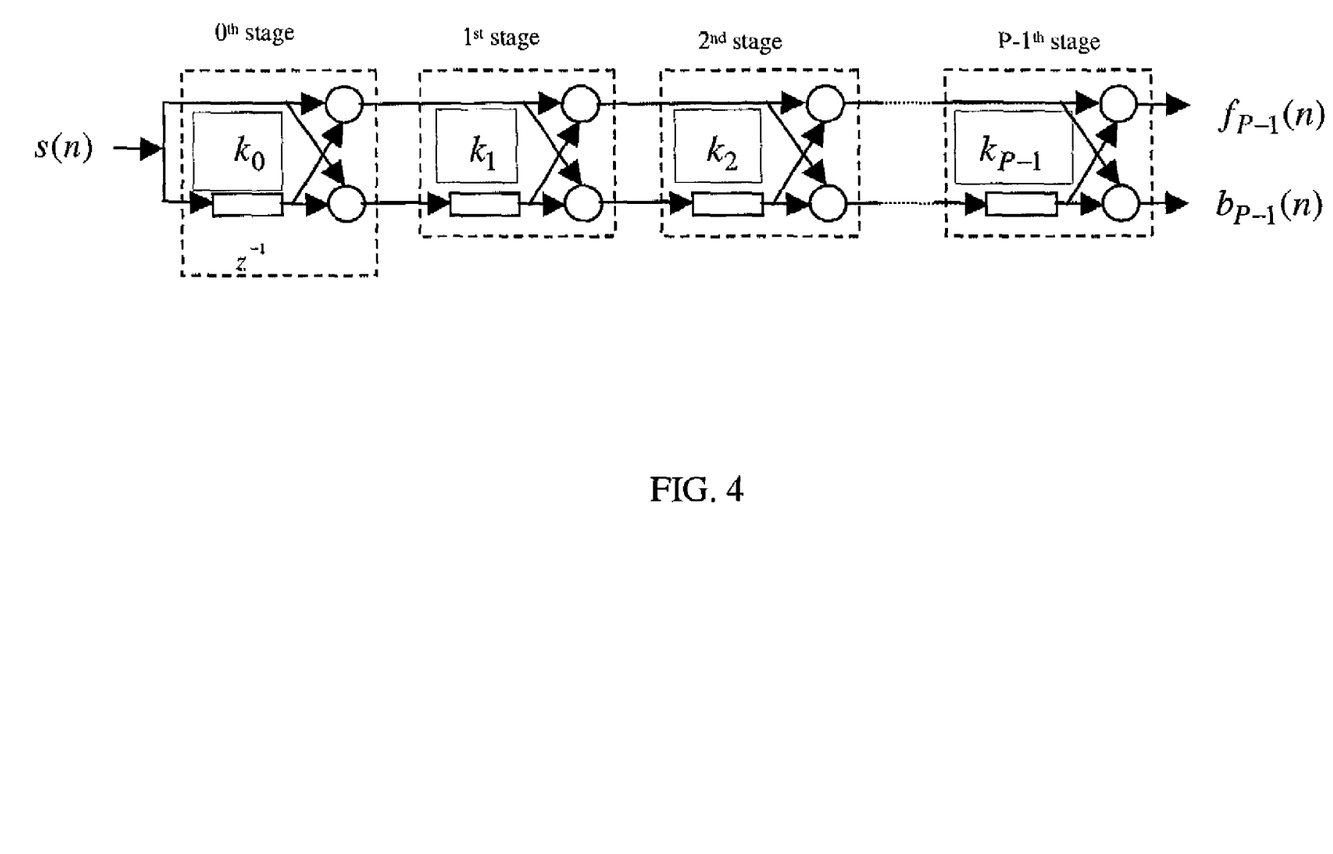
FIG. 4. is a bock diagram of an adaptive lattice filter according to an exemplary embodiment of the present invention.

In obtaining the optimal coefficients for a filter L(z), an exemplary embodiment of the present invention employs the Gradient Adaptive Lattice (GAL) method, known to one ordinarily skilled in the art and described in S. Haykin, *Adaptive Filter Theory*, Prentice-Hall, 1991, to adapt the lattice coefficients. This method minimizes the prediction error associated with an adaptive lattice filter based on the method of stochastic gradient descent method. An exemplary embodiment adaptive lattice filter L(z) is shown in FIG. 4. The update equations governing the exemplary embodiment GAL method are:

$$f_m(n) = f_{m-1}(n) + k_m(n) b_{m-1}(n-1)$$

$$\sigma^2_{m-1}(n) = \lambda \sigma^2_{m-1}(n-1) + |f_{m-1}(n)|^2$$

$$k_m(n+1) = k_m(n) - \frac{\mu}{\sigma^2_{m-1}(n)} b_{m-1}(n-1) f_m(n)$$

$$b_m(n) = b_{m-1}(n-1) + k_m(n) f_{m-1}(n)$$

where $f_m(n)$ and $b_m(n)$ are respectively the forward and the backward prediction errors associated with the $m^{th}$-stage. Note that, $f_0(n)=b_0(n)=s(n)$, $0<\lambda<1$ and the lattice coefficients $|k_m(n)|<1$, $m=0, \ldots, P-1$. This method is a version of the GAL method in the sense that the cost function minimized is the forward prediction error power only.

Figure 5:
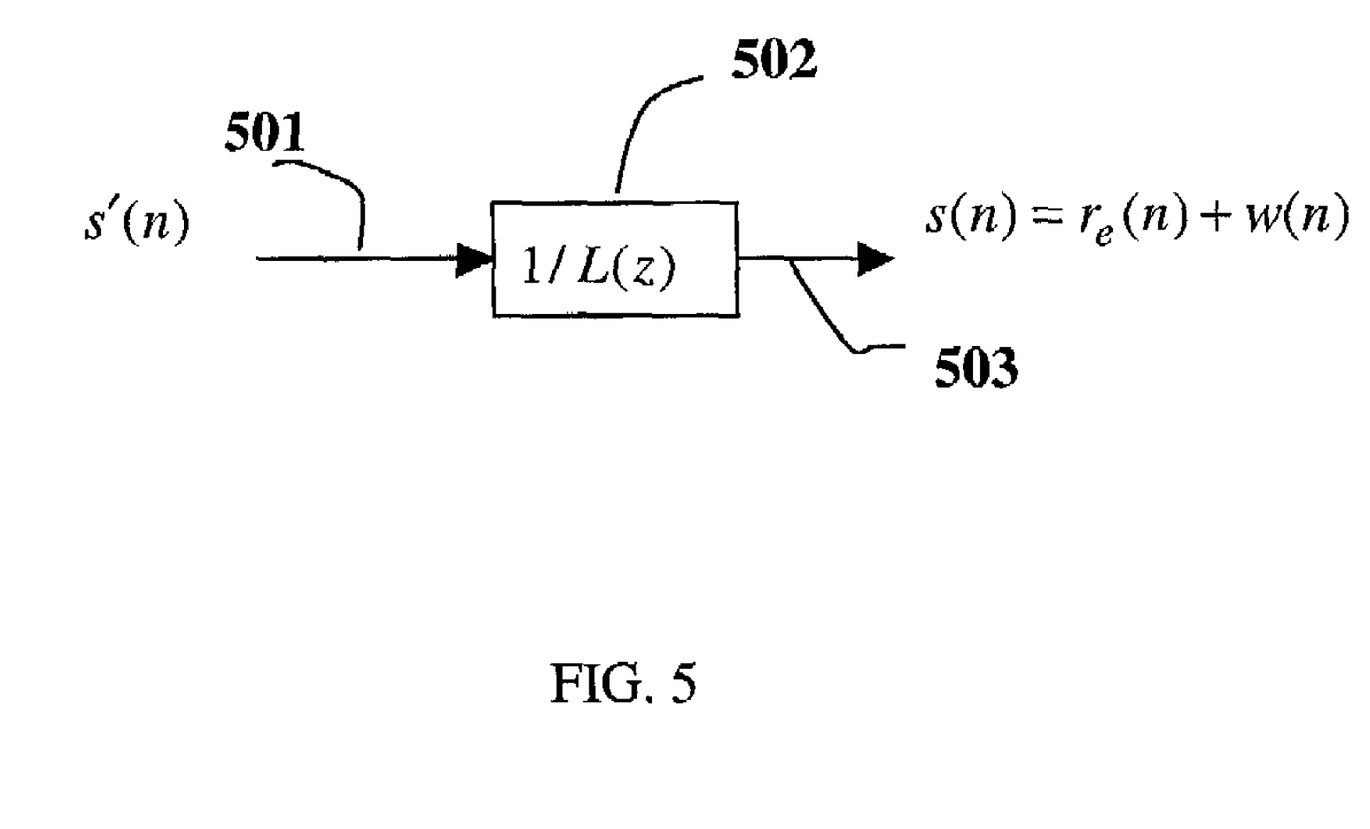
FIG. 5. is a block diagram illustrating reconstruction of a speech signal s(n), according to an exemplary embodiment of the present invention.

FIG. 5 illustrates the concept that if filter L(z) is a linear filter with all of its zeros constrained inside the unit circle, the signal s(n) could be synthesized back. In FIG. 5, a prediction error signal s'(n) at line 501 is passed through an inverse filter 1/L(z) 502 to reconstruct a speech signal s(n) at line 503. However, the filtering illustrated by FIG. 5 is not a final objective, since it could synthesize back the entire residual echo as well as the background signal.

One way to solve this problem of synthesizing back the entire residual echo along with the background signal is to use white noise instead of prediction error signal s'(n) to drive an inverse filter 1/L(z). As a result, the output signal will not likely sound like the true background signal because the correlation that cannot be whitened by a filter L(z) is still present in prediction error signal s'(n). A white excitation signal does not carry any correlation and a signal with similar correlation properties is needed as an excitation component to an inverse filter 1/L(z).

However, constructing a signal with similar correlation properties as the prediction error signal s'(n) is computationally intensive. The present invention provides another alternative in which the prediction error signal s'(n) is passed through a signum non-linearity unit. Embodiments of the present invention may use a specific non-linearity such as a "signum function" or a variant thereof. An exemplary embodiment of the present invention may define a signum function as:

$$s'_e(n) = \begin{cases} 1 & s'(n) \geq 0 \\ -1 & s'(n) < 0 \end{cases}$$

Figure 6:
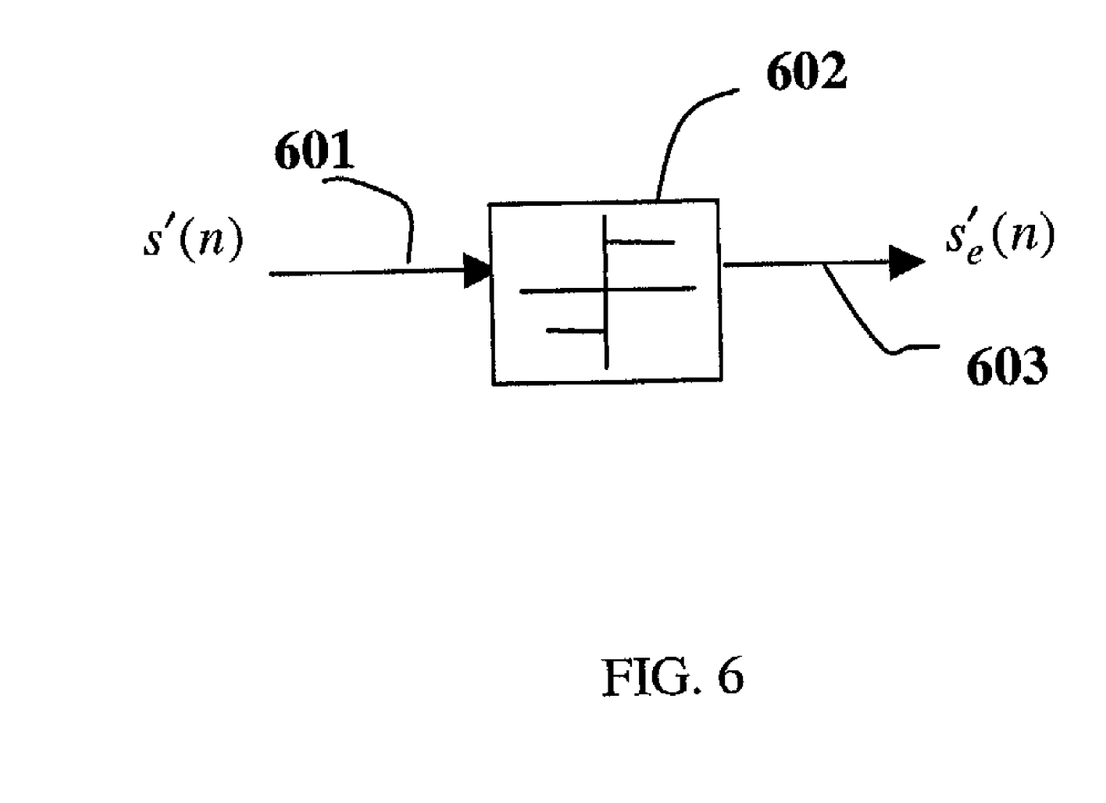
FIG. 6. is a block diagram illustrating reconstruction of a speech signal s(n) using a signum non-linearity unit, according to an exemplary embodiment of the present invention.

Thus, as illustrated in FIG. 6, after the prediction error signal s'(n) at line 601 is passed through a signum non-linearity unit 602, the output signal $s'_e(n)$ at line 603 becomes the excitation component that is in turn passed through an inverse filter 1/L(z). By using a signum non-linearity unit, the amplitude of the residual echo in the prediction error signal s'(n) can be essentially forced to be at the background level. One ordinarily skilled in the art will understand how the residual echo in the prediction error signal s'(n) can be essentially forced to be at the background level. This decreases the intelligibility of the residual echo after the signal is reconstructed or re-synthesized.

Figure 7:
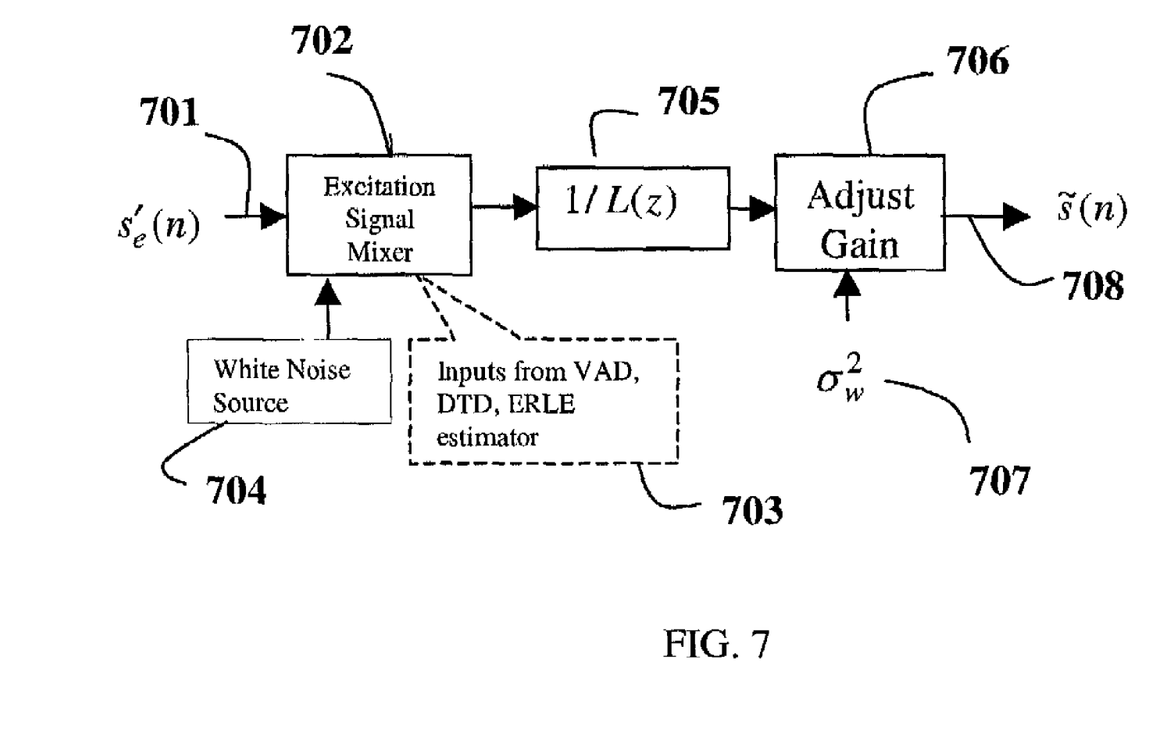
FIG. 7. is a block diagram illustrating reconstruction and modification of a speech signal s(n) after it has passed through a signum non-linearity unit, according to an exemplary embodiment of the present invention.

FIG. 7 is a block diagram illustrating an exemplary embodiment of the steps reconstructing and modifying a speech signal s(n) after it passes through a signum non-linearity unit. First, at line 701, excitation component $s'_e(n)$ is passed through an excitation signal mixer 702. At the excitation signal mixer, inputs 703, such as an echo return loss enhancement (ERLE) measurement of the EC, double-talk detection from a double-talk detector (DTD), and voice activity detection from a voice activity detector (VAD) are used to determine how to mix an excitation component $s'_e(n)$ with a noise component 704 and generate an excitation signal. One ordinarily skilled in the art will understand how an ERLE measurement of the EC, double-talk detection from a double-talk detector (DTD), and voice activity detection from a voice activity detector (VAD) are used to determine how to mix an excitation component $s'_e(n)$ with a noise component 704 and generate an excitation signal. Next, the excitation signal is passed through an inverse filter 1/L(z) 705 to generate a modified residual echo. Finally, the modified residual echo is passed through a gain adjuster 706 that adjusts a power of the modified residual echo according to a background noise power measurement 707. One ordinarily skilled in the art will understand how the gain adjuster adjusts a power of the modified residual echo according to a background noise power measurement. The end result is the reconstructed signal $\tilde{s}(n)$ at line 708.

As illustrated in FIG. 7, an exemplary embodiment of the present invention may employ an excitation signal mixer 702 to help manage the residual echo in the excitation component $s'_e(n)$ that is produced by a signum non-linearity unit. Even though a signum non-linearity unit will remove almost the entire echo, some audible residual may remain under certain conditions. Therefore, the mixing performed by an excitation signal mixer may help mask components under noise. During initial convergence of an EC, the residual echo is much higher than the background signal. Under this condition, a signum non-linearity unit will mainly capture the harmonic properties due to the residual echo and when an inverse lattice filter is applied the synthesized signal may have coherent portions of residual echo. To prevent this from happening, the excitation signal mixer computes optimal mixing by adding a noise component such as a white noise source 704 (that is first passed through an inverse lattice filter to shape its spectrum) to the excitation component $s'_e(n)$ at the right proportion. For instance, when the ERLE is high, the output of the signum non-linearity unit will not have audible residual echo and it will contain the harmonic nature of the true background noise. Therefore, the optimal mixing by the excitation signal mixer is such that the mixing amount will favor the output of the signum non-linearity unit. When the ERLE is low, the output of the signum non-linearity unit may have audible residual echo. In this case, the optimal mixing by the excitation signal mixer is such that more of the spectrally-shaped white noise will be used and the amount of signal from the signum non-linearity unit output that goes into the mixing will be reduced.

As illustrated in FIG. 7, an exemplary embodiment of the present invention may employ a gain adjuster 706 to helps ensure that reconstructed signal $\tilde{s}(n)$ at line 708 is synthesized at the correct level. The gain adjuster makes use of a background noise power $\sigma_w^2$ measurement 707. An exemplary embodiment may calculate a background noise power $\sigma_w^2$ when the Sin port of the EC only receives background noise and no speech signal, according to:

$$\sigma_w^2(n) = \beta \sigma_w^2(n-1) + (1-\beta)w^2(n), 0 \ll \beta < 1$$

Figure 8:
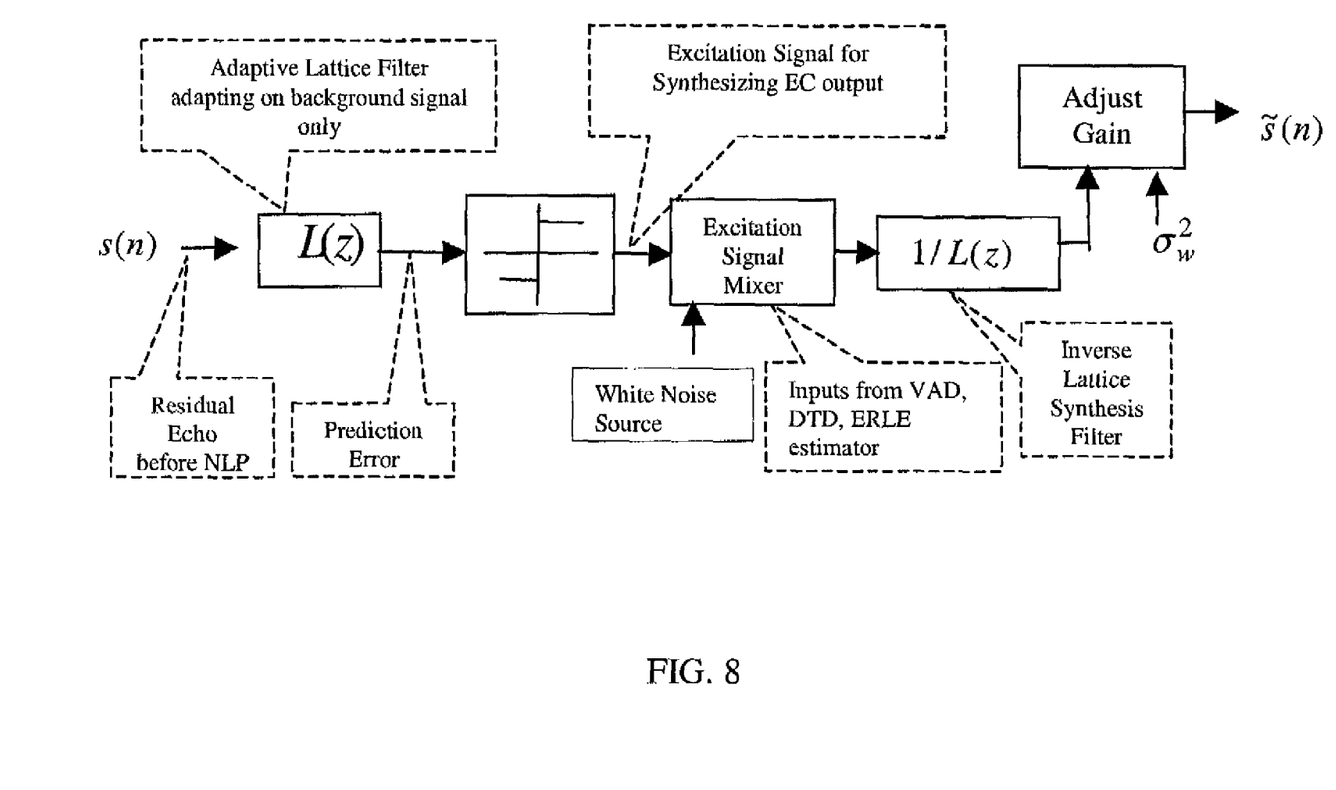
FIG. 8. is a block diagram implementing an exemplary embodiment of the present invention.

FIG. 8. is a block diagram of modules implementing an exemplary embodiment of the present invention. FIG. 8 illustrates the concepts discussed thus far in taking an input speech signal s(n), filtering it with an adaptive lattice filter and reconstructing and modifying it to yield a reconstructed signal $\tilde{s}(n)$.

Figure 9:
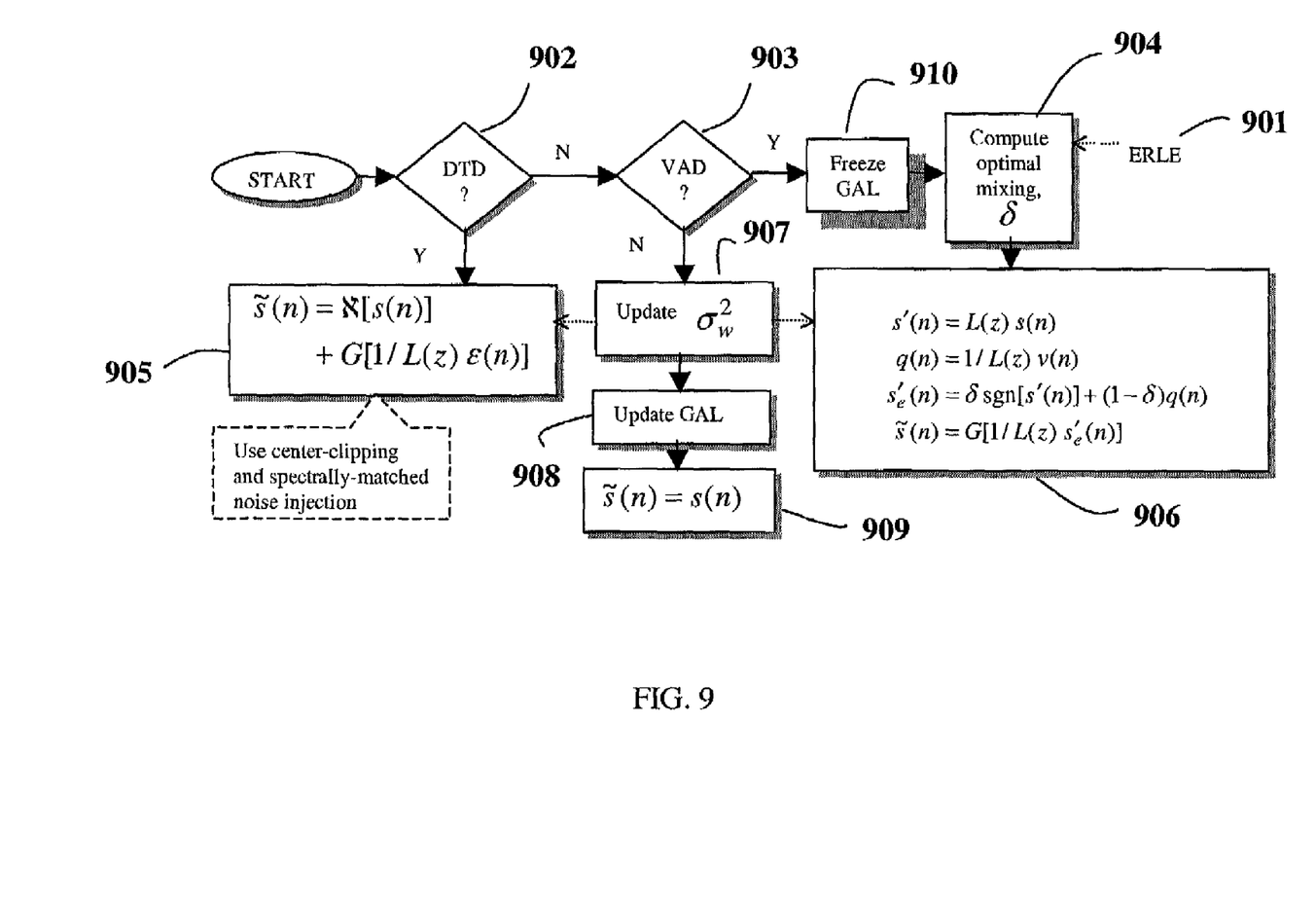
FIG. 9. is a flow chart illustrating a method for managing speech signals, according to an exemplary embodiment of the present invention.

FIG. 9 is a flow chart implementing a method for managing speech signals according to an embodiment of the present invention. Some of the steps illustrated in these figures may be performed in an order other than that which is described. It should be appreciated that not all of the steps described are required to be performed, that additional steps may be added, and that some of the illustrated steps maybe substituted with other steps. This flow chart illustrates how an exemplary embodiment of the present invention may make use of double talk detection and voice activity detection.

At step 902, double-talk in the incoming speech signal is detected. If double-talk exists, step 905 is executed and thus an exemplary embodiment of the present invention switches to a traditional NLP with center-clipping and injects spectrally matched noise by passing white noise through an inverse filter 1/L(z). The equation governing this action is:

$$\tilde{s}(n) = \aleph[s(n)] + G[1/L(z)\epsilon(n)]$$

where $\aleph[.]$ corresponds to a center-clipper, and $\epsilon(n)$ is a stationary noise source whose spectral envelope tracks that of the background noise signal, w(n), and G[.] is a gain adjust function. Alternatively, other embodiments of the present invention may pass other types of noise through the inverse filter 1/L(z).

If at step 902 double-talk is not detected, an exemplary embodiment executes step 903, where voice activity is detected. If there is no voice activity, step 907 is executed where a background noise power measurement $\sigma_w^2$ of the speech signal is taken. Next, step 908 is executed where coefficients in the adaptive lattice filter are adjusted by updating a GAL algorithm. Finally, step 909 is executed and the input speech signal is left unchanged by setting the reconstructed signal $\tilde{s}(n)$ to input speech signal s(n). Even though in this case, the input speech signal s(n) is unchanged, the background noise power $\sigma_w^2$ is still measured and the GAL algorithm is still updated for later use such as the case where voice activity is detected on the incoming speech signal.

If at step 902 double-talk is not detected and at step 903 voice activity is detected, an exemplary embodiment executes step 910 where the GAL algorithm is frozen or not updated and thus the coefficients in the adaptive lattice filter are not adjusted. Next, step 904 is executed where optimal mixing is computed by taking an input from an ERLE measurement 901. Finally, step 906 is executed, which includes the actions: (1) generating a prediction error s'(n) by passing a residual echo of the speech signal s(n) through an adaptive lattice filter L(z); (2) generating an excitation component s'$_e$(n) by passing the prediction error s'(n) through a signum non-linearity unit; (3) mixing the excitation component s'$_e$(n) with a stationary random noise signal q(n) (where q(n) may be obtained by passing a white noise source v(n) through an inverse filter 1/L(z)); (4) modifying the residual echo by passing the excitation component s'$_e$(n) through an inverse filter 1/L(z); and (5) further modifying the residual echo by passing the excitation component s'$_e$(n) through a gain adjuster that adjusts a power of the modified residual echo using a background noise power measurement. One ordinarily skilled in the art will understand how a gain adjuster adjusts a power of the modified residual echo using a background noise power measurement. The equations governing these actions are:

$$s'(n) = L(z)\ s(n)$$

$$q(n) = 1/L(z)\ v(n)$$

$$s'_e(n) = \delta\ sgn[s'(n)] + (1-\delta)q(n)$$

$$\tilde{s}(n) = G[1/L(z)\ s'_e(n)]$$

where G[.] is a gain adjust function.

In the foregoing description, the invention is described with reference to specific example embodiments thereof. It will, however, be evident that various modifications and changes may be made thereto, in software, hardware or any combination thereof, without departing from the broader spirit and scope of the present invention. The specification and drawings are accordingly to be regarded in an illustrative rather than in a restrictive sense.

What is claimed is:

1. A non-linear processor, comprising:
    an adaptive lattice filter that generates a prediction error from a residual echo of a speech signal;
    a signum non-linearity unit that generates an excitation component from the prediction error;
    an excitation signal mixer that generates an excitation signal from the excitation component and a noise component;
    an inverse lattice filter that generates a modified residual echo from the excitation signal; and
    a gain adjuster that adjusts a power of the modified residual echo.

2. The non-linear processor of claim 1, further comprising a double-talk detector that detects double-talk in the speech signal.

3. The non-linear processor of claim 1, further comprising a voice-activity detector that detects voice-activity in the speech signal.

4. The non-linear processor of claim 1, wherein the adaptive lattice filter employs a gradient adaptive lattice algorithm.

5. The non-linear processor of claim 1, wherein the excitation signal mixer uses an echo return loss enhancement measurement.

6. The non-linear processor of claim 1, wherein the noise component is a stationary random noise signal.

7. The non-linear processor of claim 1, wherein the noise component is obtained by passing a white noise source through the inverse lattice filter.

8. The non-linear processor of claim 1, wherein the gain adjuster uses a background noise power measurement.

9. A method of processing a residual echo of a speech signal, comprising:
   generating a prediction error from the residual echo;
   generating an excitation signal from the prediction error and a noise component by generating an excitation component from a signum non-linearity unit and mixing the excitation component with the noise component; and
   generating a modified residual echo from the excitation signal.

10. The method of claim 9, further comprising detecting double-talk on the speech signal.

11. The method of claim 9, further comprising detecting voice-activity on the speech signal.

12. The method of claim 9, wherein generating the prediction error comprises passing the residual echo through an adaptive lattice filter.

13. The method of claim 12, wherein passing the residual echo through an adaptive lattice filter further comprises employing a gradient adaptive lattice algorithm.

14. The method of claim 9, wherein the noise component is a stationary random noise signal.

15. The method of claim 9, wherein generating the modified residual echo from the excitation signal comprises passing the excitation signal through an inverse lattice filter.

16. The method of claim 9, wherein generating the modified residual echo from the excitation signal comprises adjusting a power of the modified residual echo using a background noise power measurement.

17. A method of processing a speech signal comprising:
   center-clipping a residual echo from the speech signal in response to detecting absence of double-talk on the speech signal;
   injecting onto the speech signal white noise that matches a spectral envelope of a background signal of the speech signal by passing white noise through an inverse lattice filter; and
   adjusting a power of the speech signal.

18. The method of processing a speech signal in claim 17, wherein adjusting a power of the speech signal further comprises using a power measurement of the background noise power.

* * * * *

UNITED STATES PATENT AND TRADEMARK OFFICE
CERTIFICATE OF CORRECTION

PATENT NO. : 7,050,545 B2
APPLICATION NO. : 10/121437
DATED : May 23, 2006
INVENTOR(S) : Oguz Tanrikulu and John O. DellaMorte, Jr.

It is certified that error appears in the above-identified patent and that said Letters Patent is hereby corrected as shown below:

On the front page, after "Assignee:", delete "Tallabs Operations, Inc." and insert --Tellabs Operations, Inc.--.

Signed and Sealed this

Sixth Day of November, 2007

JON W. DUDAS
*Director of the United States Patent and Trademark Office*